United States Patent [19]

Weiss

[11] Patent Number: 4,720,860

[45] Date of Patent: Jan. 19, 1988

[54] METHOD AND APPARATUS FOR POSITIVELY IDENTIFYING AN INDIVIDUAL

[75] Inventor: Kenneth P. Weiss, Boston, Mass.

[73] Assignee: Security Dynamics Technologies, Inc., Cambridge, Mass.

[21] Appl. No.: 676,626

[22] Filed: Nov. 30, 1984

[51] Int. Cl.⁴ .............................................. H04L 9/00
[52] U.S. Cl. ...................................... 380/23; 380/25; 380/28; 380/48
[58] Field of Search ............... 178/22.08, 22.09, 22.17; 364/900; 235/380, 382; 380/23-25, 28, 43, 44, 48

[56] References Cited

U.S. PATENT DOCUMENTS

| | | | |
|---|---|---|---|
| 3,806,874 | 4/1974 | Ehrat | 178/22.08 |
| 4,145,568 | 3/1979 | Ehrat | 178/22.08 |
| 4,145,569 | 3/1979 | Ehrat | 178/22.17 |
| 4,277,837 | 7/1981 | Stuckert | 364/900 |
| 4,295,039 | 10/1981 | Stuckert | 235/380 |
| 4,302,810 | 11/1981 | Bouricius et al. | 178/22.08 |
| 4,471,216 | 9/1984 | Herve | 235/380 |
| 4,536,647 | 8/1985 | Atalla et al. | 178/22.08 |
| 4,578,530 | 3/1986 | Zeidler | 380/25 |
| 4,599,489 | 7/1976 | Cargile | 380/25 |
| 4,609,777 | 9/1986 | Cargile | 380/25 |

Primary Examiner—Salvatore Cangialosi
Assistant Examiner—Aaron J. Lewis
Attorney, Agent, or Firm—Wolf, Greenfield & Sacks

[57] ABSTRACT

An apparatus for the electronic generation and comparision of non-predictable codes. The appartus of the invention comprises a first mechanism for calculating a first non-predictable code according to a predetermined algorithm, the first mechanism for calculating including a first mechanism for inputting a unique static variable into the predetermined algorithm; a first mechanism for automatically defining a first dynamic variable according to the interval of time in which the first mechanism for inputting is activated, the first mechanism for automatically defining including a mechanism for automatically making the first dynamic variable available to the predetermined algorithm of the first mechanism for calculating; a second mechanism for calculating a second non-predictable code according to the predetermined algorithm, the second mechanism for calculating including a second mechanism for inputting the unique static variable into the predetermined algorithm; a second mechanism for automatically defining a second dynamic variable according to the interval of time in which the second mechanism for inputting is activated, the second mechanism for automatically defining including a mechanism for automatically making the second dynamic variable available to the predetermined algorithm of the second mechanism for calculating; and a mechanism for comparing the first non-predicatable code with the second non-predictable code.

3 Claims, 3 Drawing Figures

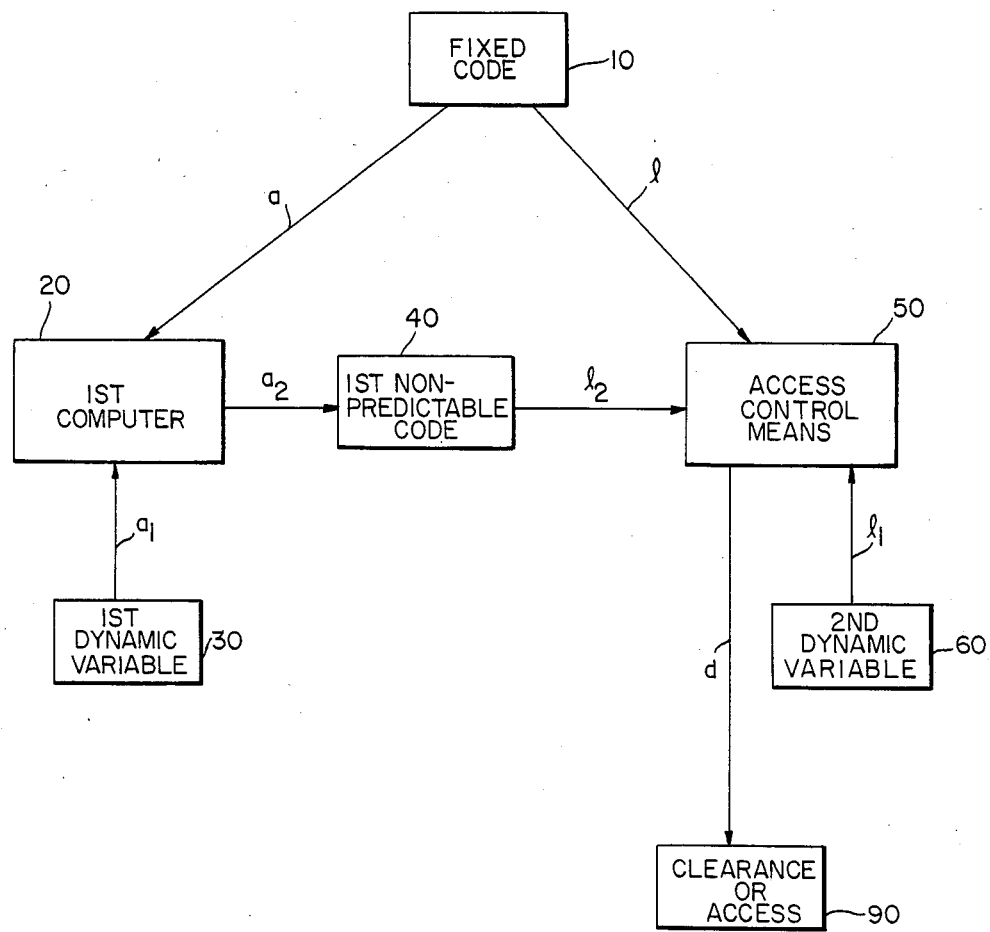
FIG. IA

METHOD AND APPARATUS FOR POSITIVELY IDENTIFYING AN INDIVIDUAL

BACKGROUND OF THE INVENTION

The present invention relates to an apparatus and method for the electronic generation of variable, non-predictable codes and the validation and comparison of such codes for the purpose of positively identifying an authorized individual or user of an apparatus or system and thereafter giving clearance to carry out a privileged transaction or access to a protected system or facility.

There often arises a need to prevent all but selected authorized persons from being able to carry out some defined transaction (such as granting of credit) or to gain access to electronic equipment or other system, facility or data (hereinafter "clearance or access"). Prior methods for preventing unauthorized clearance or access typically involve devices which limit access to the subject data, facility, or transaction to those who possess a unique physical device, such as a key or who know a fixed or predictable (hereinafter "fixed") secret code. The problem inherent in relying on a fixed code or unique physical device as the means to gain such selective clearance or access is that would-be unauthorized users need only obtain possession of the fixed code or unique device to gain such clearance or access. Typical instances of fixed codes are include card numbers, user numbers or passwords issued to customers of computer data retrieval services. The principal object of the invention is to provide a practical approach to generating identification codes which are unique to the user and which change periodically without user intervention but which provide a readily verifiable means of identification for providing clearance or access at any time.

SUMMARY OF THE INVENTION

The present invention eliminates the relatively easy access afforded to someone who copies or otherwise misappropriates a secret "fixed" code by periodically generating identification codes by using fixed codes, variable data, and a predetermined algorithm which is unknown in advance and unknowable outside the administration of the security system even to authorized users of the apparatus utilizing the fixed secret code. The predetermined algorithm constantly generates new unique and verifiable non-predictable codes, which are derived from the fixed data and at least one dynamic variable, such as the time of day by the predetermined algorithm. The constant changes in the dynamic variables when processed by the algorithm results in the generation of constantly changing non-predictable codes.

In accordance with the invention there is provided an apparatus for electronic generation, comparison and validation of non-predictable codes comprising a first means for calculating a first non-predictable code according to a predetermined algorithm, the first means for calculating including first means for inputting a static variable into the predetermined algorithm; a first means for automatically defining a first dynamic variable according to the interval of time in which the first means for inputting is activated, the first means for automatically defining including means for automatically making the first dynamic variable available to the predetermined algorithm of the first means for calculating; a second means for calculating a second non-predictable code according to the predetermined algorithm, the second means for calculating including a second means for inputting the static variable into the predetermined algorithm; a second means for automatically defining a second dynamic variable according to the interval of time in which the second means for inputting is activated, the second means for automatically defining including means for automatically making the second dynamic variable available to the predetermined algorithm of the second means for calculating; and, a means for comparing the first non-predictable code with the second non-predictable code.

The first means for calculating preferably comprises a first computer loaded with a first program for carrying out the predetermined algorithm and the first computer preferably comprises a microprocessor wherein the first program is stored in a volatile dynamic memory encapsulated with an energizing means which when interrupted destroys all data including the program and the static variable input into the first program. Most preferably all data, programs, and results of operation are stored in the volatile dynamic memory.

The first means for automatically defining the first dynamic variable preferably comprises a time keeping means which automatically makes the first dynamic variable available to the predetermined algorithm. At the moment the static variable is input into the algorithm, the first dynamic variable is defined according to the interval of time in which the static variable is input.

The first means for automatically defining preferably includes means for automatically making the the first dynamic variable available to the algorithm of the first computer.

The second means for calculating preferably comprises an access control means which is loaded with a second program for carrying out the predetermined algorithm.

The second means for automatically defining the second dynamic variable typically comprises a time keeping means which automatically makes the second dynamic variable available to the predetermined algorithm of the access control means. At the moment the static variable is input into the algorithm of the access control means, the second dynamic variable is defined by the time keeping means according to the interval of time in which the static variable is input. The second means for automatically defining preferably includes means for automatically making the second dynamic variable available to the algorithm of the access control means.

The apparatus most preferably includes a means for immediate sequential communication of the static variable to the second calculator and the first non-predictable code to the means for comparing respectively. The second means for calculating preferably includes the means for comparing.

In a most preferred form of the invention, the first computer and the first means for automatically defining the first dynamic variable are incorporated into a card of about the same size as a credit card.

In accordance with the invention the method for the generation and comparison of non-predictable codes comprises the steps of: inputting a static variable into a first computer including a predetermined algorithm; employing the algorithm of the first computer to calculate a first non-predictable code on the basis of the static variable and a first dynamic variable defined by the interval of time in which the step of inputting occurred; putting the static variable into an access control means independently including the predetermined algorithm; using the algorithm of the access control means to independently calculate a second non-predictable code on the basis of the static variable and a second dynamic variable defined by the interval of time in which the step of putting occurred; and comparing the non-predictable codes calculated in the steps of using and employing wherein the first dynamic variable and the second dynamic variable are equivalent so as to generate matching codes from the algorithm only when the steps of using and employing occur within the same interval of time.

The step of employing preferably comprises defining the first dynamic variable with a time keeping means which automatically defines and makes the first dynamic variable available for input into the algorithm of the first computer in response to the input of the static variable into the first computer. The first dynamic variable, once defined, is automatically input into the algorithm of the first computer by conventional electronic means. The step of putting preferably further comprises communicating the first non-predictable code to a means for comparing the first and second non-predictable codes within the same interval of time in which the step of inputting occurs.

The step of using preferably comprises defining the second dynamic variable with a time keeping means which automatically defines and makes the second dynamic variable available for input into the algorithm of the access control means in response to the putting of the static variable into the second computer. The second dynamic variable, once defined, is automatically input into the algorithm of the access control means by conventional electronic means.

The volatile dynamic memory included in either or both of the first computer, the access control means, and the means for comparing preferably stores and maintains all programs such as the predetermined algorithm system operating programs, code comparison programs, and the like; and the volatile dynamic memory further preferably stores, maintains and makes available for use all data and results of operations such as fixed codes, dynamic variables and the like.

BRIEF DESCRIPTION OF THE DRAWINGS

Other objects, features and advantages will be apparent from the following detailed description of preferred embodiments thereof taken in conjunction with the accompanying drawings in which:

FIG. 1A is a block diagram of a preferred apparatus and method for generating and comparing non-predictable codes where a means for comparing non-predictable codes is included in a calculator which generates a non-predictable code.

DETAILED DESCRIPTION OF THE INVENTION

The following discussion describes the most preferred embodiments of the invention.

Figure 1:
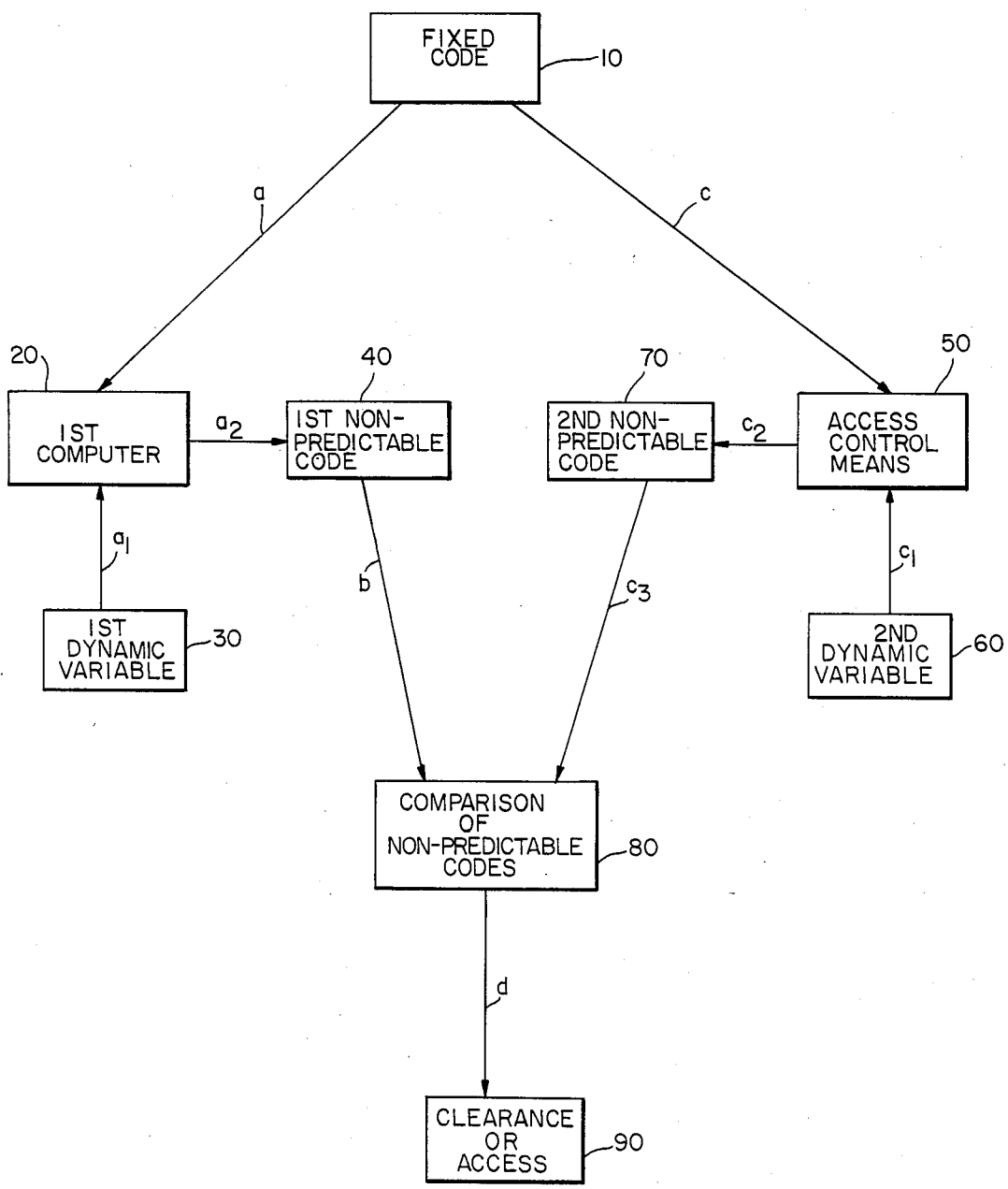
FIG. 1 is a block diagram of a basic apparatus and method according to the invention for generating and comparing non-predictable codes.
Figure 2:
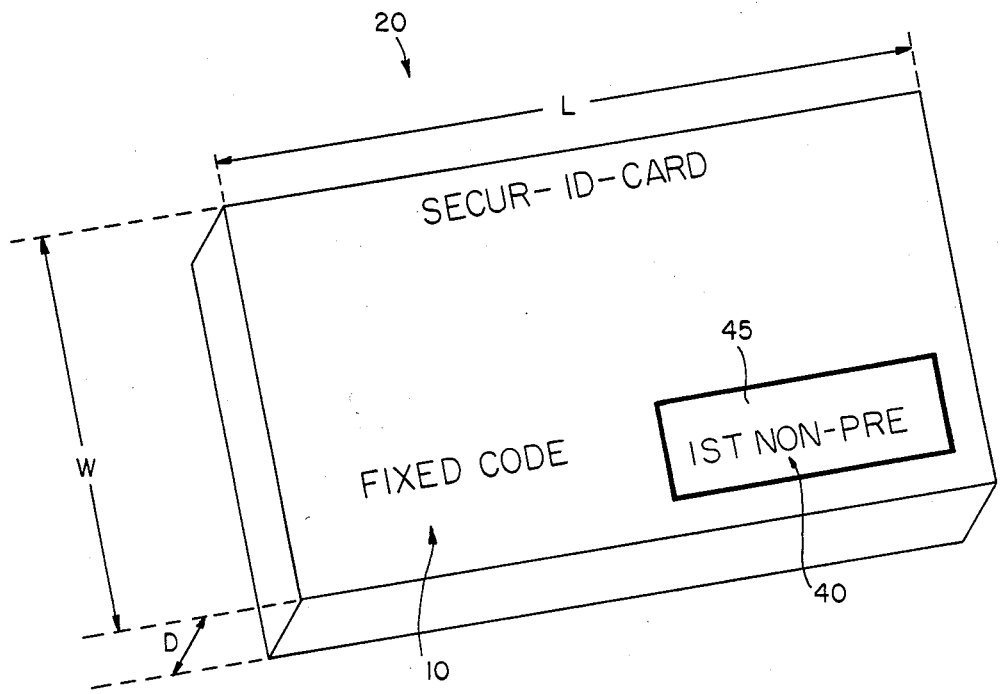
FIG. 2 is a front isometric view of a credit card sized calculator for calculating a first non-predictable code for use in gaining clearance or access according to the invention.

In accordance with the invention an authorized person is provided with a fixed secret code 10, FIGS. 1, 1A, 2, typically a number, which is unique to that individual. In the case of a credit or bank/cash card 20, FIG. 2, that number 10 may be printed on the card itself such that if the authorized owner of the card forgets the number, it can be quickly retrieved by reference to the card or other permanently printed form of the fixed code 10. Where the fixed code 10 is provided in permanent printed form on or in close connection with the apparatus of the invention there is also preferably provided an additional portion of the fixed code 10 which the authorized user memorizes in order to further guard against misappropriation of the fixed code. The fixed code may alternatively be used to identify an authorized terminal which has been issued by the authority presiding over the granting of clearance or access.

In order to generate a code which will ultimately give the user clearance or access, the fixed code must be input into a predetermined algorithm which manipulates the fixed code as a static variable. The algorithm is typically provided to the user in the form of a first calculator which is loaded with a program for carrying out the predetermined algorithm. With reference to the Figures the calculator preferably comprises an electronic computer 20 and most preferably comprises a microprocessor and a sufficient amount of volatile dynamic memory to store and carry out the functions of the predetermined algorithm. The computer 20 is most preferably provided in a card 20, FIG. 2, having the appearance and approximate size of a credit card.

Such credit card sized computer 20, FIG. 2, also preferably includes a conventional liquid crystal display 45 for displaying the ultimate non-predictable code 40 generated by the algorithm. The non-predictable code 40 thus generated may be visually observed by the user for eventual input into an access control means 50, FIGS. 1, 1A. As shown in FIG. 2, the preferred form of computer 20 has a length L of about 3.3 inches, a width W of about 2.1 inches and a depth D of less than about 0.07 inches. In addition or as an alternative to providing microprocessor 20 with a liquid crystal display 45 for visual observation of the first non-predictable code 40, computer 20 may include means for machine reading the first non-predictable code 40 to the access control means 50, FIG. 1A, or may include sound producing or other means for personally sensing the first non-predictable code 40.

In addition to using the fixed code 10 as a static variable the predetermined algorithm is designed to utilize a second variable, a dynamic variable 30, 60, FIGS. 1, 1A, to calculate the non-predictable codes 40, 70 which ultimately give access or clearance 90 to the user. The dynamic variable may comprise any code, typically a number, which is defined and determined by the interval of time in which the static variable 10 is put into the algorithm. The dynamic variable is most preferably defined by the date and the minute in which the static variable is input into the predetermined algorithm. A dynamic variable thus defined can be seen to change every minute. The dynamic variable could alternatively be defined according to any interval of time, e.g., 2 minutes, 5 minutes, 1 hour and the like. A dynamic variable thus defined would alternatively change every 1 minute, 2 minutes, 5 minutes, 1 hour or passage of any other predetermined interval of time.

With reference to FIG. 1 the most preferred means of establishing such a dynamic variable is via a time keeping means, such as an electronic digital clock, which by conventional means automatically makes the dynamic variable to a means which automatically inputs, steps $a_1$ or $c_1$, the date and specific interval of time (e.g., 1 minute, 2 minutes, 5 minutes, etc.) into the predetermined algorithm in response to the input, step a or c, of the static variable 10. The date and time thus generated by the time keeping means may itself be independently manipulated according to another predetermined algorithm prior to input into the first predetermined algorithm of the dynamic variable. The fact that the dynamic variable 30 or 60 being input into the predetermined algorithm constantly changes in absolute value with passage of successive intervals of time of predetermined duration means that the code 40 or 70 generated according to the predetermined algorithm is also constantly changing with successive intervals of time and is thereby completely non-predictable.

The non-predictability of the codes 40, 70, FIG. 1, generated in the manner described above may be enhanced by the fact that the predetermined algorithm (together with the static variable 10 and dynamic variable 30 input thereinto) may preferably be stored in the calculator 20 provided to authorized users in volatile dynamic electronic memory which is encapsulated with an energizing means which destroys the algorithm, the static variable 10, and the dynamic variable 30 when the electronic memory is invaded, interrupted or violated in any way. The predetermined algorithm thus stored in such volatile electronic memory cannot be discovered by a would-be thief because the entire memory including the predetermined algorithm is destroyed upon invasion of the memory.

In a most preferred embodiment of the invention where the static variable/fixed code 10 is stored in such volatile dynamic memory and by conventional means is automatically input step a, FIGS. 1, 1A, into the algorithm of the first computer at regular intervals of time. Such automatic inputting of the fixed code 10 may thereby work in conjunction with the automatic definition and inputting of the first dynamic variable 30 into the predetermined algorithm of the first computer 20 to effect completely automatic generation of the first non-predictable code 40 at regular intervals of time.

The invention most preferably contemplates providing authorized personnel with a computer 20, FIGS. 1, 1A, 2, only, but not with knowledge of the predetermined algorithm included in the computer 20. Authorized personnel are, therefore, provided with a computer 20 capable of carrying out an algorithm which is unknown to such authorized personnel.

In the most preferred embodiment of the invention where the predetermined algorithm provided to authorized users is stored in a volatile dynamic memory encapsulated with an energizing means which destroys the algorithm upon invasion of the memory, the only means of gaining unauthorized clearance or access 90 is to misappropriate possession of the original computer 20 itself (and knowledge of the fixed code/static variable 10). In an embodiment of the invention where the means for establishing the dynamic variable 40 is not incorporated into the computers 20 themselves, would-be unauthorized users would further require possession of an appropriate means for defining the dynamic variable according to the appropriate interval of time in which the fixed code/static variable 10 is input, step a, FIGS. 1, 1A, into the predetermined algorithm of the computer 20. The static variable/fixed code 10 is preferably stored within volatile dynamic memory and automatically input into the predetermined algorithm of the first computer for computation of the first non-predictable code.

The algorithm may alternatively be designed to manipulate more than one fixed code and/or more than one dynamic variable. Several means for inputting each fixed code and dynamic variable may be included in the calculator provided to users and in the access control means. Each dynamic variable is preferably defined by the interval of time in which one or more of the fixed codes (selected static variables) are input into the algorithm.

It can be seen, therefore, that the predetermined algorithm can comprise any one of an infinite variety of algorithms. The only specific requirement for an algorithm to be suitable for use in the present invention is that such algorithm generate a non-predictable code on the basis of two classes of variables, static variables (the fixed codes) and dynamic variables such as described hereinabove. A non-predictable code C which is ultimately generated by the predetermined algorithm, f (x,y), may be expressed mathematically as:

$$f(x,y)=C$$

where x is a static variable/fixed code and y is a dynamic variable. Where several (n) static variables ($x_1, x_2, \ldots x_n$) and several (n) dynamic variables ($y_1, y_2, \ldots y_n$) are intended for use in generating non-predictable codes, a non-predictable code thus generated may be expressed mathematically as $f(x_1, x_2, \ldots x_n, y_1, y_2, \ldots y_n)=C$.

The specific form of the algorithm only assumes special importance as part of the invention, therefore, when the algorithm is capable of being discovered by would-be unauthorized users. In the most preferred embodiment of the invention where the algorithm is completely undiscoverable by virtue of its storage in a volatile dynamic electronic memory which destroys the algorithm upon attempted invasion of the encapsulated memory, the specific form of the algorithm comprises only an incidental part of the invention. The mere fact of the use of some algorithm to manipulate the fixed code and the dynamic variable does, however, comprise a necessary part of the invention insofar as such an algorithm generates the ultimately important non-predictable code.

With reference to FIG. 1, after a first non-predictable code 40 is generated as described above, such first non-predictable code is compared 80 with another "second" non-predictable code 70 which is also generated by the user by putting, step c, the fixed code/static variable 10 into an access control means 50 which contains the same predetermined algorithm used to generate the first non-predictable code 40. With reference to FIG. 1A, in a preferred embodiment of the invention the first non-predictable code 40 is put, step $e_2$, into the access control means 50 essentially immediately after the fixed secret code 10 is put into the access control means 50 (i.e., step $e_2$ is carried out essentially immediately after step e) in order to gain clearance or access 90.

With reference to FIG. 1A, if steps e and $e_2$ are not carried out within the same interval of time as step a was carried out, then step c will not generate a second dynamic variable 60 which will allow the predetermined algorithm of the access control means 50 to generate a non-predictable code 70 which matches the 1st non-predictable code 40.

The second calculator typically comprises a access control means 50, FIG. 1, containing a program for carrying out the algorithm and a second means for establishing a second dynamic variable 60 which is defined by the interval of time in which the user puts, step c, the fixed code/static variable 10 into the access control means 50. The second means for establishing the second dynamic variable most preferably comprises a second time-keeping means, such as a digital clock, which is synchronized with the first time-keeping means so as to generate a dynamic variable 60 which when inputted into the access control means will generate a non-predictable code 70 which matches code 40 only when steps b and c, FIG. 1 (or steps e and $e_2$, FIG. 1A) occur within the same interval of time. Such second time keeping means preferably defines the second dynamic variable 60 by the date and minute (or other predetermined interval of time) in which the fixed code/static variable 10 is put, step c, into the access control means.

The second time keeping means is preferably synchronized with time keeping means such that if the fixed code 10, FIG. 1, is put into the access control means 50 within the same predetermined interval of time (i.e. 1 minute, 5 minutes, hour, etc.) as the fixed code 10 is input into the first computer 20, the second time keeping means generates, step $c_1$, the identical dynamic variable 60 as the first time keeping means generates, step $a_1$, and the algorithms of the first computer 10 and the access control means 50 thereby generate, steps $a_2$ and $c_2$, identical and matching non-predictable codes. As with the first time keeping means the second time keeping means preferably puts, step $c_1$, the second dynamic variable 60 automatically into the access control means 50 in response to the putting, step c, of the fixed code/static variable 10 into the access control means 50. Steps $a_1$ and $c_1$, therefore, preferably occur automatically upon the carrying out of steps a and c respectively.

With reference to FIG. 1, once the second non-predictable code 70 is generated, step $c_2$, by the second means for calculating 50, the first non-predictable code 40 is compared 80 with the second non-predictable code 70 and if they match the user is granted clearance or access 90. The means for comparing the two independently generated non-predictable codes 40, 70, typically comprises a comparison algorithm included in a computer into which the first non-predictable code 40 and the second non-predictable code 70 are input, steps b, $c_3$, after they are generated. Steps b and $c_3$ are preferably carried out automatically in the conventional manner.

The authorized user of the first computer 10, FIG. 1, is typically required to personally sense the first non-predictable code 40 after steps a, $a_1$, and $a_2$ are completed (e.g. by sight, sound or otherwise) and then communicate, step c, the first non-predictable code to the means for comparing 80. The second non-predictable code however is preferably automatically communicated to the means for comparing 80.

Automatic communication of the second non-predictable code to the means for comparing, step $c_3$, is preferably accomplished by including a program for comparing the non-predictable codes in the access control means 50 itself, whereby the comparison program communicates with the predetermined algorithm included in the access control means 50. The second non-predictable code 70 may alternatively be automatically communicated, step $c_3$, to a separate device including a conventional means for comparing the non-predictable codes.

FIG. 1A depicts in block form the sequence of steps that would be carried out in the most preferred form of the invention where the access control means 50 includes the means for comparing the non-predictable codes. Fixed code 10 is input, step a (also preferably automatic), into first computer 20 and the first dynamic variable 30 is automatically input, step $a_1$, into the first computer 20 in response to the carrying out of step a. The first non-predictable code 40 is then generated, step $a_2$, essentially automatically after the fixed code 10 is input, step a, into the first computer 20. The first non-predictable code 40 is personally sensed by the user and the fixed code 10 and the first non-predictable code 40 are then input by conventional telephonic/electronic means, steps e and $e_2$, into the access control means 50. By conventional means step e inputs the fixed code 10 into the predetermined algorithm and step $e_2$ communicates the first non-predictable code 40 to the means for comparing the first 40 and second 70 non-predictable codes. The second dynamic variable 60 is automatically input, step $e_2$, in response to the carrying out of step e. The second non-predictable code 70, FIG. 1, is automatically generated, step $c_2$ by access control means 50 in response to the carrying out of steps e and $e_1$, FIG. 2. The second non-predictable code 70, FIG. 1, is automatically communicated to the comparison means 80 included in the access control means 50 of FIG. 1A. Step $e_2$ is preferably carried out essentially immediately after step e is effected. The comparison means 80 included in the access control means 50, FIG. 1A, thereby compares the non-predictable codes 40, 70, FIG. 1, essentially automatically upon the completion of steps e and $e_2$.

With reference to FIG. 1A, where the access control means 50 is physically remote from the first calculator 20, the fixed secret code 10 and the first non-predictable code 40 are typically transmitted together (i.e. the fixed code 10 first and the non-predictable code 40 following immediately thereafter) to access control means 50 in the conventional manner. Such transmission, steps e and $e_2$, is typically effected by telephonic transmission with or without the aid of a conventional modem. In the most preferred embodiment of the invention, for example, where the first calculator comprises a credit-card sized microprocessor 20, FIG. 2, having a liquid crystal display 45, the user accomplishes step $e_2$, FIG. 1A, by first reading the non-predictable code 40 from the liquid crystal display and then telephonically transmitting the fixed code 10 and the non-predictable 40 code to the access control means 50. The actual transmission of the fixed code 10 and the non-predictable code 40 may alternatively be effected by reading the codes 10 and/or 40 into the access control means 50 by conventional electronic or mechanical means.

In most practical applications of the invention the granting of clearance or access 90, is effected automatically by conventional electronic means if the non-predictable codes match when compared with each other.

With reference to FIG. 1, steps a and c and must be performed within the same interval of time of predetermined duration in order to generate equivalent first 30 and second 60 dynamic variables and, a fortiori, matching first 40 and second 70 non-predictable codes.

In a preferred embodiment of the invention, step a, FIGS. 1, 1A, is carried out automatically by suitable electronic means provided in the first computer 20. Where step a is carried out automatically, the first non-predictable code 40 is, therefore, generated completely automatically by first computer 20 every minute, 2 minutes or other predetermined interval of time. In such a preferred embodiment, therefore, the invention will generate matching non-predictable codes 40, 70 if step c, alone, is carried out by the user within the same minute or other predetermined interval of time in which the dynamic variables 30, 60 are constantly being established and re-established by synchronized time keeping means. With reference to FIG. 1A, in a most preferred embodiment of the invention where step $e_2$ occurs immediately after step e, the user must carry out both of steps e and $e_2$ within the same interval of time as the first computer 20 has automatically generated the first non-predictable code 40.

FIG. 2 depicts the most preferred form of the calculator 20 which is provided to authorized users for generating the first non-predictable code 40. As shown in FIG. 2 the calculator 20 is of substantially the same size as a conventional credit card and includes a conventional liquid crystal display 45 for displaying the first non-predictable code 40 to the user. The credit card-/computer 20, FIG. 2, typically bears the identity of the fixed code 10 printed on its face, and includes both the means for generating the first dynamic variable 30, FIGS. 1, 1A, and a microprocessor having a sufficient amount of volatile dynamic memory to include the predetermined algorithm which generates the first dynamic variable.

In the form of the invention where the goal is to grant access 90 to data stored in one or more host computers remote from the first computers issued to authorized users, an access control means 50 is typically located in close physical proximity to such remotely located host computers such as in a host computer room.

The access control means 50 itself typically comprises one or more master access devices, physically remote from the first computers 20 issued to users. Such master access control devices include a dictionary of many or all of the unique fixed codes issued to authorized personnel (or assigned to authorized terminals).

The access control means 50 may be portable such that it may be carried by a security guard stationed at a central access location in a guarded building or other facility. A security guard thus in possession of such an access control mechanism would typically read the fixed 10 and non-predictable code 40 appearing on the card 20, FIG. 2, of an authorized person and input such codes 10, 40 into the portable access control mechanism 50 to determine whether the bearer of the card is truly in possession of a first computer 20 which was issued by the authority establishing the secret predetermined algorithm.

As described herein protection of the secrecy of the predetermined algorithm is preferably accomplished in the calculators provided to authorized personnel by virtue of its storage in volatile dynamic memory and encapsulation with a volatile dynamic energizing means. With respect to the algorithm provided in the access control means secrecy may be maintained in a similar manner or other conventional manner, e.g., by physically guarding the access control means or requiring additional access/user codes to gain direct access. Where all programs, data and results of operation are stored in such volatile dynamic memory, the same are similarly protected against invasion.

Although the invention contemplates some form of communication of the result of operation carried out on the first computer 20, FIGS. 1, 1A, to the access control means 50 (or the comparison means 80, if physically separated from the access control means 50) in order to compare the non-predictable codes 40, 70, the invention does not contemplate a talking between the first computer 20 and the access control means 50, the comparison means 80 or any other electronic device. Therefore, after the first computer 20 has calculated the first non-predictable code 40, no other information need be communicated to the first computer 20 from another device in order to gain clearance or access.

It will now be appreciated to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. An identification system for identifying an individual comprising:

first computer means including first clock means for generating a first time dependent dynamic variable, means for storing a predetermined static variable, first means for utilizing said first time dependent dynamic variable and said static variable to calculate a first non-predictable code in accordance with a predetermined algorithm, and means for providing a visual display of the first non-predictable code calculated at at least a selected time interval;

second computer means including second clock means for generating a second time dependent dynamic variable, means for obtaining said predetermined static variable, second means for utilizing said second time dependent dynamic variable and said static variable to calculate at a selected time interval a second non-predictable code in accordance with said predetermined algorithm, means for obtaining the first non-predictable code displayed during said selected time interval, match means for comparing the second non-predictable code generated during said selected time interval with the first non-predictable code obtained during said selected time interval, and means responsive to a match between said first and second non-predictable codes in said match means for signifying identification;

said first and second computer means independently generating said first and second non-predictable codes for comparison thereof without communication of the second computer means or the second clock means back to the first computer means there being no physical or electrical connection between said first and second computer means; and wherein a static variable is communicated to the means for obtaining at the second computer by an individual located at the first computer, the individual to be identified communicating the displayed first non-predictable code and the static variable to the means for obtaining at the second computer.

2. A system as claimed in claim 1 wherein said first means to calculate includes a stored program for performing said predetermined algorithm, and wherein said program and said first static variable are stored in volatile dynamic memory which causes said program and static variable to be destroyed if an attempt is made to gain access thereto.

3. A system as claimed in claim 1 wherein said first computer means is incorporated in a portable, hand-held device.

* * * * *